US012239256B2

(12) United States Patent
Simon et al.

(10) Patent No.: US 12,239,256 B2
(45) Date of Patent: Mar. 4, 2025

(54) OUTDOOR COOKING APPLIANCE CONTROL SYSTEM

(71) Applicant: Halo Products Group, LLC, Elizabethtown, KY (US)

(72) Inventors: Paul J. Simon, Elizabethtown, KY (US); Michael R. Giebel, Joplin, MO (US)

(73) Assignee: WH PRODUCTS, LLC, Columbus, OH (US)

( * ) Notice: Subject to any disclaimer, the term of this patent is extended or adjusted under 35 U.S.C. 154(b) by 0 days.

(21) Appl. No.: 17/715,708

(22) Filed: Apr. 7, 2022

(65) Prior Publication Data

US 2022/0322871 A1  Oct. 13, 2022

Related U.S. Application Data

(60) Provisional application No. 63/171,927, filed on Apr. 7, 2021.

(51) Int. Cl.
A47J 36/32     (2006.01)
A23L 5/10      (2016.01)
A47J 37/07     (2006.01)
G05D 23/24     (2006.01)

(52) U.S. Cl.
CPC .............. *A47J 36/321* (2018.08); *A23L 5/15* (2016.08); *A47J 37/0704* (2013.01); *G05D 23/24* (2013.01); *A23V 2002/00* (2013.01); *A47J 2202/00* (2013.01)

(58) Field of Classification Search
CPC ....... A47J 36/321; A47J 2202/00; A23L 5/15; G05D 23/24; A23V 2002/00

USPC .......................................................... 99/331
See application file for complete search history.

(56) References Cited

U.S. PATENT DOCUMENTS

| 5,960,783 | A  | * | 10/1999 | Schubert ................. F24C 3/103 |
| | | | | 126/41 R |
| 7,605,349 | B2 | * | 10/2009 | Gaynor ................. A47J 27/004 |
| | | | | 165/47 |
| 8,800,542 | B1 | * | 8/2014 | Kennington .......... F24B 15/005 |
| | | | | 99/333 |
| 8,931,400 | B1 | * | 1/2015 | Allen ...................... A47J 36/00 |
| | | | | 99/344 |
| 9,645,611 | B2 | * | 5/2017 | Chen ..................... F21V 33/008 |
| 10,092,129 | B2 | * | 10/2018 | Jenkins .................... F24C 7/08 |
| 10,660,474 | B2 | * | 5/2020 | Gafford .............. A47J 37/0786 |
| 10,701,199 | B2 | * | 6/2020 | Colston .............. H04W 68/005 |
| 10,708,409 | B2 | * | 7/2020 | Colston .................. G08C 17/02 |
| 10,720,077 | B2 | * | 7/2020 | Vengroff ............... A47J 36/321 |
| 10,735,575 | B2 | * | 8/2020 | Colston ................ A47J 36/321 |
| 10,791,208 | B2 | * | 9/2020 | Colston .............. H04W 68/005 |
| 11,181,275 | B2 | * | 11/2021 | Regueiro Fernandez ................... |
| | | | | F24B 1/1895 |

(Continued)

FOREIGN PATENT DOCUMENTS

WO    WO-2021038528 A1 *  3/2021  ............ A47J 36/321

*Primary Examiner* — Jimmy Chou
(74) *Attorney, Agent, or Firm* — David R Yohannan

(57) ABSTRACT

A battery-operated wireless control system for outdoor cooking and heating appliances is disclosed. The system may include an electronic controller paired to a wireless temperature probe and a wireless monitor device capable of storing and recharging the wireless temperature probe. The electronic controller may control the operation of a fuel supply assembly, a fan assembly, and a spark generating assembly included in the appliance.

12 Claims, 6 Drawing Sheets

(56) References Cited

U.S. PATENT DOCUMENTS

| | | | | |
|---|---|---|---|---|
| 11,248,801 B2* | 2/2022 | Donnelly | A47J 37/0709 | |
| 11,519,607 B2* | 12/2022 | Cowan | F24C 3/122 | |
| 2010/0156343 A1* | 6/2010 | Jung | H02J 50/70 | 320/108 |
| 2011/0050164 A1* | 3/2011 | Partovi | H02J 50/90 | 320/108 |
| 2012/0237646 A1* | 9/2012 | De Luca | G06Q 30/04 | 99/357 |
| 2013/0061765 A1* | 3/2013 | Reinhart | F24C 15/001 | 236/49.5 |
| 2014/0048293 A1* | 2/2014 | Luongo | F24C 3/122 | 169/65 |
| 2014/0348987 A1* | 11/2014 | Cheng | A47J 27/08 | 99/331 |
| 2015/0036881 A1* | 2/2015 | Sharma | G06F 18/285 | 382/103 |
| 2015/0037471 A1* | 2/2015 | Fung | A23L 5/10 | 99/344 |
| 2015/0064314 A1* | 3/2015 | Manuel | A23L 5/10 | 707/731 |
| 2015/0134761 A1* | 5/2015 | Sharma | H04L 67/55 | 709/204 |
| 2015/0208858 A1* | 7/2015 | Robbins | A47J 27/002 | 426/231 |
| 2015/0257573 A1* | 9/2015 | Gabara | A47J 27/04 | 126/379.1 |
| 2015/0312964 A1* | 10/2015 | Sorenson | H05B 1/0266 | 219/443.1 |
| 2015/0338283 A1* | 11/2015 | Chien | H02J 7/0047 | 320/108 |
| 2016/0037966 A1* | 2/2016 | Chin | A47J 37/0682 | 99/333 |
| 2016/0088685 A1* | 3/2016 | Henke | H05B 6/062 | 99/332 |
| 2016/0098746 A1* | 4/2016 | Lewis | G06Q 30/0252 | 705/14.5 |
| 2016/0137402 A1* | 5/2016 | Talon | A47J 31/407 | 426/115 |
| 2016/0327281 A1* | 11/2016 | Bhogal | F24C 15/008 | |
| 2017/0025882 A1* | 1/2017 | Chien | H02J 7/007192 | |
| 2017/0138797 A1* | 5/2017 | Brown | G01K 1/14 | |
| 2018/0125296 A1* | 5/2018 | Gafford | H04W 4/021 | |
| 2018/0292092 A1* | 10/2018 | Bhogal | F24C 7/085 | |
| 2018/0340842 A1* | 11/2018 | Nivala | G01K 1/024 | |
| 2018/0353003 A1* | 12/2018 | Sabata | H04Q 9/00 | |
| 2019/0128531 A1* | 5/2019 | Abdoo | A23L 5/15 | |
| 2019/0154266 A1* | 5/2019 | Egenter | A47J 36/321 | |
| 2019/0250044 A1* | 8/2019 | Chiu | H04W 4/38 | |
| 2019/0266876 A1* | 8/2019 | Allen, Sr. | A47J 36/321 | |
| 2019/0285483 A1* | 9/2019 | Cheng | G01K 1/024 | |
| 2019/0289119 A1* | 9/2019 | Colston | G08C 17/02 | |
| 2019/0289120 A1* | 9/2019 | Colston | G08C 17/02 | |
| 2019/0289121 A1* | 9/2019 | Colston | H04M 1/72415 | |
| 2019/0289122 A1* | 9/2019 | Colston | G08C 17/02 | |
| 2019/0307289 A1* | 10/2019 | Palmer | F24C 7/085 | |
| 2020/0129006 A1* | 4/2020 | Nivala | G08B 21/24 | |
| 2020/0141813 A1* | 5/2020 | Nivala | G01K 13/00 | |
| 2020/0232647 A1* | 7/2020 | Jung | F24C 3/126 | |
| 2021/0219776 A1* | 7/2021 | Mulvaney | A47J 36/321 | |
| 2021/0281088 A1* | 9/2021 | Feng | H02J 7/0042 | |
| 2021/0328461 A1* | 10/2021 | Han | H02J 7/007192 | |
| 2021/0338010 A1* | 11/2021 | Hamel | A47J 37/0786 | |
| 2022/0117438 A1* | 4/2022 | Lion | G01K 1/026 | |
| 2022/0187859 A1* | 6/2022 | Santana | A47J 36/32 | |

* cited by examiner

OUTDOOR COOKING APPLIANCE CONTROL SYSTEM

CROSS-REFERENCE TO RELATED APPLICATIONS

This application claims the benefit of U.S. Provisional Application No. 63/171,927 filed Apr. 7, 2021, the disclosure of which is hereby incorporated by reference herein in its entirety.

FIELD OF THE INVENTION

Embodiments of the present invention relate to systems and methods of controlling food cooking appliances with and without the use of a wireless meat thermometer. Embodiments of the present invention also relate to wireless thermometers used for cooking.

BACKGROUND OF THE INVENTION

Outdoor cooking, and particularly the use of outdoor barbecue grills, smokers, and griddles, remains very popular. A number of different appliances are currently available to cook food outdoors. Such appliances require some form of power and/or fuel to generate the heat required for cooking, or in some instances to power systems used to ignite and control the combustion of a given fuel. Over the years, the most popular power/fuel source has varied. Historically, popular heat/fuel sources have included electrical heating elements, wood logs and chips, charcoal briquettes, propane gas, natural gas, and more recently biomass pellets. References herein to a "pellet grill" are intended to include all grills, smokers and griddles that use some form of pelletized fuel, whether or not such fuel is technically considered biomass fuel.

Biomass pellets have several advantages over other fuel sources for outdoor cooking. For one, biomass pellets are relatively easy and safe to transport and store. Still further, biomass pellets may be manufactured to provide a particular "flavor" to the food as a result of combusting a pellet including a particular wood type. For example, a consumer may select hickory, maple, or cherry pellets, or a combination of pellet flavors, to impart a desired flavor to the cooked food. As compared with charcoal, wood, or even gas, biomass pellets are also capable of providing a controlled burn rate and level of heat. Pellet grills are considered as particularly useful for slow cooking foods which enables the smoke flavor from the wood in the pellets to permeate the food. Slow cooking, however, requires that the chef either monitor the cooking food closely over a period of many hours (sometimes upwards of 5 hours), or use a reliable pellet grill control system that will maintain desired temperatures in the cooking chamber at each cooking stage. Such control systems necessarily must include one or more thermometers to provide the control system with real-time temperature information. These control systems, may, or may not, also include a thermometer adapted to determine the internal temperature of cooking foods.

Existing control systems usually, if not universally, require an alternating current (AC) power source, greatly limiting the environments in which such control systems, and associated grills, can be used. Accordingly, there is a need for a grill, smoker and/or griddle control system that is powered by a direct current (DC) power source. Existing grills, smokers and/or griddles, however, do have some disadvantages as currently designed. Thus, there is also a need for a grill, smoker and/or griddle that is untethered to a continuous supply of AC electrical power.

Existing control systems have also lacked user friendly control input mechanisms and information screens. Accordingly, there is a need for a grill, smoker and/or griddle control system having input mechanisms and information screens that are simple and easy for an enthusiast to use to input control signals and monitor appliance operations.

Existing control systems, for the most part, also have lacked preferred wireless connectivity with other nodes in the system, such as thermometers, wireless devices, and device applications. In the past, connectivity has required that users set up and pair such devices together, and with the control system, if at all. This pairing requirement limits the types of, and number of, devices that are part of the system, and adds an extra layer of complication for cooking enthusiasts. Accordingly, there is a need for a grill, smoker and/or griddle control system that limits or eliminates the need for pairing devices together by the user.

In the past, most thermometers used to determine internal food temperatures with grills, smokers and/or griddles have been hard-wire connected to the appliance control system. While such systems simplify power supply to the thermometer, they are often awkward to use, require unsightly and hard to clean wires extending between the thermometer and control system, and present a burn hazard. Such systems also have a practical limit on the number of thermometers that may be used if a mass of tangled wires is to be avoided. Accordingly, there is a need for a grill, smoker and/or griddle control system that does not require a hard-wire connection between the control system and each thermometer connected thereto.

While there do exist some wireless thermometers for use in grills, smokers and/or griddles, such thermometers usually, if not universally, require pairing with a smart device by the user. As noted above, pairing adds a layer of complexity that is problematic for some users. Moreover, pairing requires the availability of a smart device, and inherently limits monitoring using this smart device to its owner unless the owner is willing to lend his smart device to others for a period of many hours. Accordingly, there is a need for a grill, smoker and/or griddle control system that incorporates a wireless thermometer that does not need to be paired to a smart device by an end user, and that is preferably already paired at the time of appliance purchase for the user.

Indeed, there is also a need for a wireless thermometer that does not require the use of a smart device at all, and that may be already paired to one or more dedicated wireless thermometer mobile monitor devices at the time of purchase. Further, there is a need for a set of pre-paired wireless thermometers, a set of pre-paired mobile monitor devices that can be accessed at various locations about a home and yard, and a pre-paired grill, smoker and/or griddle controller/indicator that is fastened to the appliance head unit, and a grill, smoker and/or griddle itself, all of which are capable of operating using DC power.

OBJECTS OF THE INVENTION

Accordingly, it is an object of some, but not necessarily all embodiments of the present invention to provide a grill, smoker and/or griddle that is untethered to a continuous supply of AC electrical power.

It is also an object of some but not necessarily all embodiments of the present invention to provide a grill, smoker and/or griddle control system having input mechanisms and information screens that are simple and easy for a user to use to input control signals and monitor operations.

It is also an object of some but not necessarily all embodiments of the present invention to provide a grill, smoker and/or griddle control system that limits or eliminates the need for pairing devices together by the user.

It is also an object of some but not necessarily all embodiments of the present invention to provide a grill, smoker and/or griddle control system that does not require a hard-wire connection between the control system and each thermometer connected thereto.

It is also an object of some but not necessarily all embodiments of the present invention to provide a grill, smoker and/or griddle control system that incorporates one or more wireless thermometers that do not need to pair to a smart device, but are instead paired to the control system and/or one or more low-cost dedicated temperature monitors at the time of appliance purchase. It is an object for some embodiments of the present invention for the control system to act as a wireless "hub" for the one or more wireless thermometers.

It is also an object of some but not necessarily all embodiments of the present invention to provide one or more wireless thermometers that do not require the use of a smart device but are instead paired to one or more low-cost dedicated monitors (i.e., thermometer readouts). As a result, the individual person monitoring temperature does not need to possess the appliance owner's smart device (e.g., cell phone) to monitor temperature. Instead, friends, grandparents, children, and spouses, can all monitor the temperature without possession of anyone else's cell phone using the one or more low-cost dedicated temperature monitors. Further, multiple low-cost dedicated temperature monitors can be conveniently placed in the grill environment—around the yard, house, etc., avoiding the need to carry a smart device, and/or giving others the chance to be "back-up" temperature monitors.

It is another object of some, but not necessarily all embodiments of the present invention to provide a wireless thermometer that may be already paired to a grill, smoker and/or griddle itself and to one or more associated dedicated wireless devices at the time of purchase wherein the wireless devices serve as holders for the wireless thermometer, a charging station for the wireless thermometer, and/or a battery life indicator for the wireless thermometer.

SUMMARY OF EMBODIMENTS OF THE INVENTION

Responsive to the foregoing challenges, Applicant has developed an innovative an outdoor cooking appliance system associated with a manufacturer, comprising: an outdoor cooking appliance head unit, said head unit including a heat generating system, a cooking surface, and a resistance temperature detector (RTD); said heat generating system including one or more of a fuel supply assembly, a fan assembly, and a spark generating assembly; an electronic controller fixedly connected to the head unit, said electronic controller having a human interface readout screen and a control knob, said electronic controller hardwired to one or more of the fuel supply assembly, the fan assembly, and the spark generating assembly; a wireless temperature probe wirelessly paired to the electronic controller; and a wireless monitor device dedicated to, and wirelessly paired to, the wireless temperature probe, said wireless monitor device including a battery-operated display configured to indicate a numeric temperature measured by the wireless temperature probe, wherein the electronic controller is configured to wirelessly connect to a smart device, wherein the electronic controller is configured to wirelessly connect to an Internet accessible data source associated with the manufacturer, and wherein, responsive to electronic information provided by one or more of the smart device, the Internet accessible data source, the wireless temperature probe, and the RTD, the electronic controller is configured to control one or more of: the operation of the fuel supply assembly, the operation of the fan assembly, and the operation of the spark generating assembly.

Applicant has also developed an innovative method for controlling an outdoor cooking appliance system associated with a manufacturer, wherein the outdoor cooking appliance system includes: an outdoor cooking appliance head unit, said head unit including a heat generating system, a cooking surface, and a resistance temperature detector (RTD); said heat generating system including one or more of a fuel supply assembly, a fan assembly, and a spark generating assembly; an electronic controller fixedly connected to the head unit, said electronic controller having a human interface readout screen and a control knob, said electronic controller hardwired to one or more of the fuel supply assembly, the fan assembly, and the spark generating assembly; a wireless temperature probe wirelessly paired to the electronic controller; and a wireless monitor device dedicated to, and wirelessly paired to, the wireless temperature probe, said wireless monitor device including a battery operated display configured to indicate a numeric temperature measured by the wireless temperature probe, wherein the electronic controller is configured to wirelessly connect to a smart device, and wherein the electronic controller is configured to wirelessly connect to an Internet accessible data source associated with the manufacturer through said smart device, said method comprising the steps of: receiving at the electronic controller, electronic information provided by the smart device, the Internet accessible data source, the wireless temperature probe, and the RTD; and responsive to the electronic information, the electronic controller controlling one or more of: the operation of the fuel supply assembly, the operation of the fan assembly, and the operation of the spark generating assembly.

Applicant has further developed an innovative system for controlling an outdoor cooking appliance associated with a manufacturer, comprising: an outdoor cooking appliance head unit, said head unit including a heat generating system, a cooking surface, and a resistance temperature detector (RTD); said heat generating system including one or more of a fuel supply assembly, a fan assembly, and a spark generating assembly; an electronic controller fixedly connected to the head unit, said electronic controller having a human interface readout screen and a control knob, said electronic controller hardwired to one or more of the fuel supply assembly, the fan assembly, and the spark generating assembly; a wireless temperature probe wirelessly paired to the electronic controller; a wireless monitor device dedicated to, and wirelessly paired to, the wireless temperature probe, said wireless monitor device including a battery-operated display configured to indicate a numeric temperature measured by the wireless temperature probe, said wireless monitor device including a cavity for receiving and holding the wireless temperature probe, a DC battery, and an induction coil operatively connected to the DC battery, said induction coil configured to recharge the wireless temperature probe; and a primary DC battery disposed within said head unit, said primary DC battery configured to power the electronic controller and to power one or more of the fuel supply assembly, the fan assembly, and the spark generating assembly, wherein the wireless temperature probe and the wireless monitor device are wirelessly paired to each other by the manufacturer, wherein the electronic controller is configured to wirelessly connect to a smart device, wherein the electronic controller is configured to wirelessly connect to an Internet accessible data source associated with the manufacturer through said smart device, and wherein, responsive to electronic information provided by one or more of the smart device, the Internet accessible data source, the wireless temperature probe, and the RTD, the electronic controller is configured to control the operation of the fuel supply assembly and the operation of the spark generating assembly.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Figure 1:
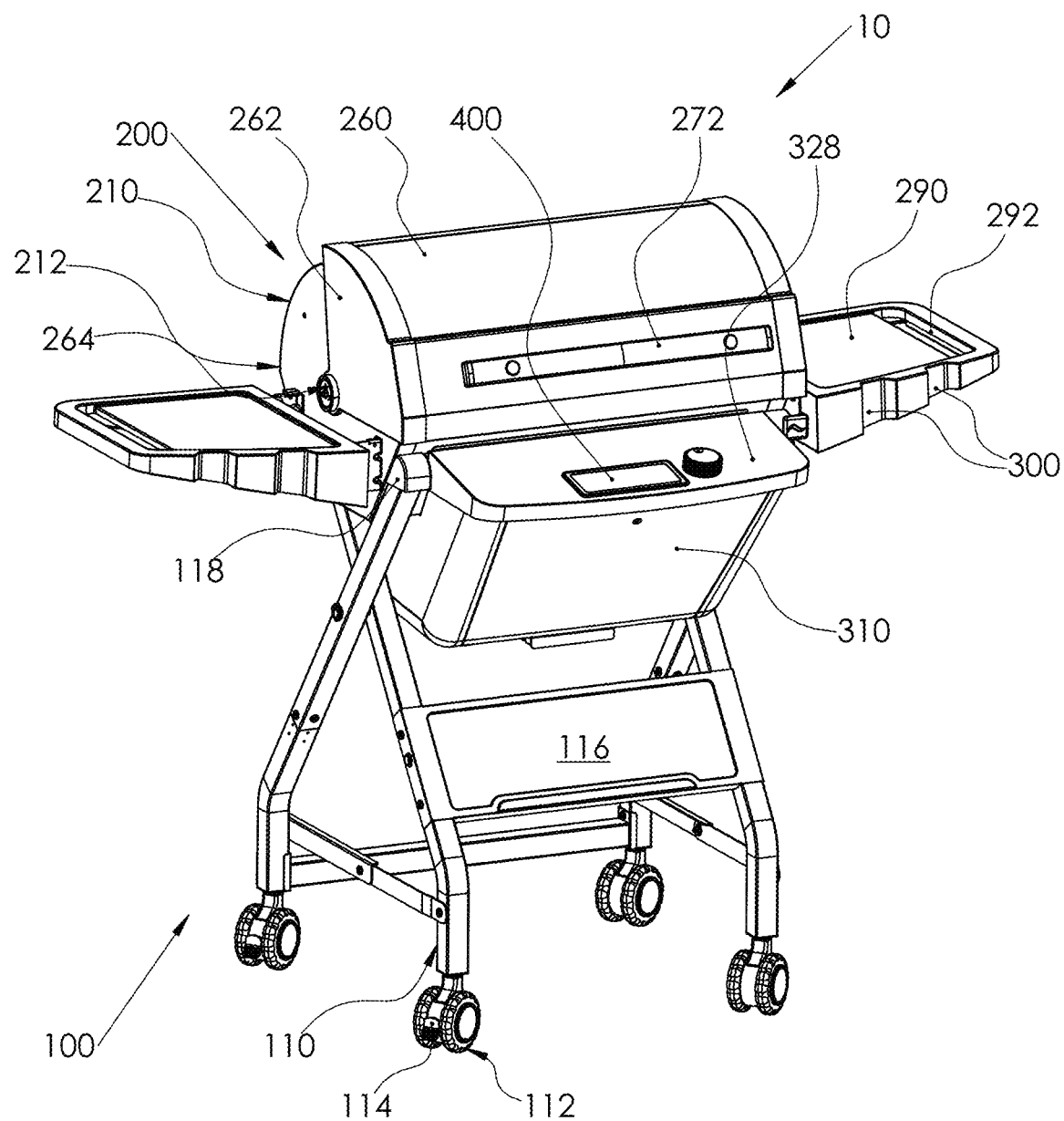
FIGS. 1 and 10 are perspective views of the front of a grill, smoker or griddle in accordance with embodiments of the invention.

Reference will now be made in detail to embodiments of the present invention, examples of which are illustrated in the accompanying drawings. With reference to FIG. 1, a grill, smoker or griddle 10 may include a lower cart 100 and an upper head unit 200. The cart 100 may include two sets of interconnected base legs 110 joined by one or more cart lateral supports 116 and central fashioners, such as screws, bolts, cotter pins, or the like. The cart legs 110 may be provided with caster wheels 112 and wheel locks 114. The leg tops 118 may be removably connected to the head unit 200. The size, shape, and design of the cart 100 may be varied without departing from the intended scope of the invention. For example, in alternative embodiments, the cart may include an enclosed cabinet for storage and/or esthetic purposes.

The head unit 200 may include a grill, smoker or griddle body 210 having a left side wall 212, and a right side wall 214, respectively. Side tables 290 may be connected to the grill body 210 along the left and right side walls 212 by one or more hinges. The outer edges of the side tables 290 may be provided with handles 292 adapted for gripping. The head unit 200 or the leg tops 118 may be provided with connection mechanisms to lock and unlock the head unit 200 to/from the cart 100. The side tables 290 may also be provided with one or more scalloped recesses 300 with raised embossed interior surfaces. The embossments may be provided with flat magnets on their inner surfaces so as to provide magnetic tool holders.

The front of the head unit 200 may include a pellet hopper 310 that has a side-to-side width that is substantially the same as the width of the grill, smoker or griddle body 210 (i.e., the distance between the left and right side wall). The pellet hopper 310 may have smoothly shaped edges to prevent injury to a user. The pellet hopper 310 also may taper inwardly from top to bottom to allow the user to more easily gain access to and operate the appliance, and to promote the flow of pellets in a downward direction under the influence of gravity. The lid 328 of the pellet hopper 310 may include a center recess adapted to receive a wireless controller unit 400 and one or more batteries. The head unit 200 may also include a rollback lid 260 having opposing lid sides 262 and a front contoured or bowed handle 272. The rollback lid 260 may pivot about pivot point caps 264.

The hopper interior wall may be sized to provide support for the controller system 400 and battery compartment. The controller system 400 may be connected to one or more temperature sensing devices. For example, temperature measurements may be taken using one or more resistance temperature detectors (RTDs) 402 positioned as needed in the cooking chamber and/or the heating chamber.

Figure 2:
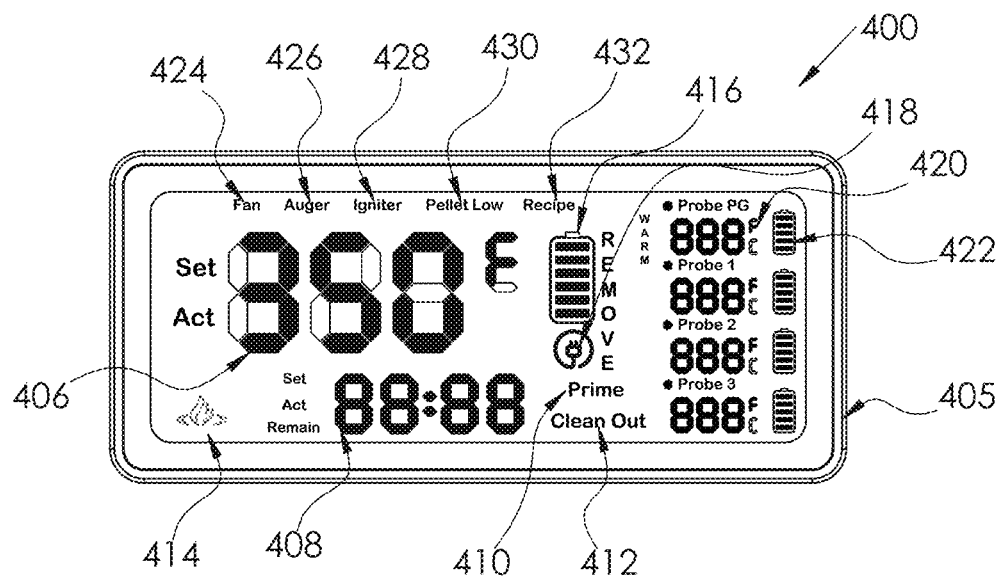
FIG. 2 is a front view of a grill, smoker or griddle controller information display in accordance with embodiments of the invention.
Figure 3:
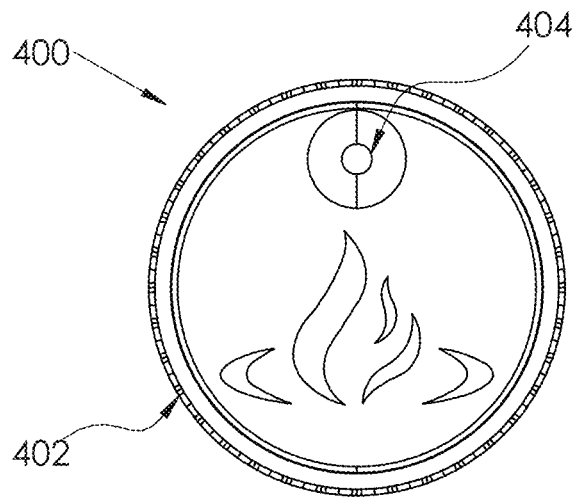
FIG. 3 is a front view a grill, smoker or griddle control dial in accordance with embodiments of the invention.
Figure 4:
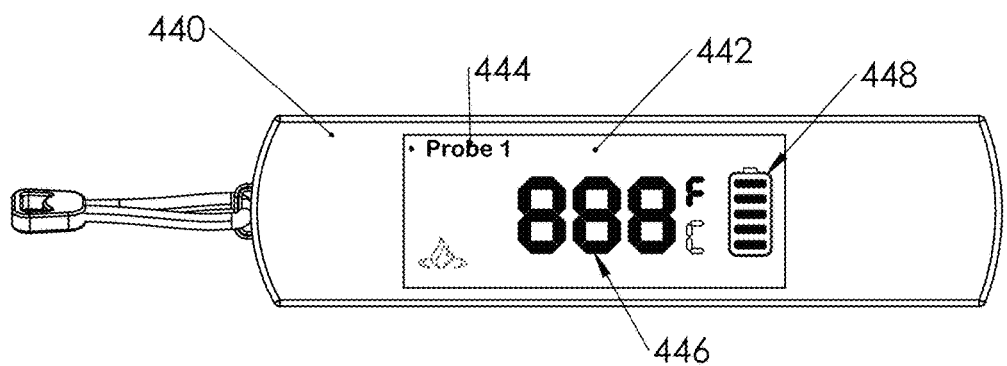
FIG. 4 is a front view of a temperature probe holder or recharging/indicator case in accordance with embodiments of the invention.
Figure 5:
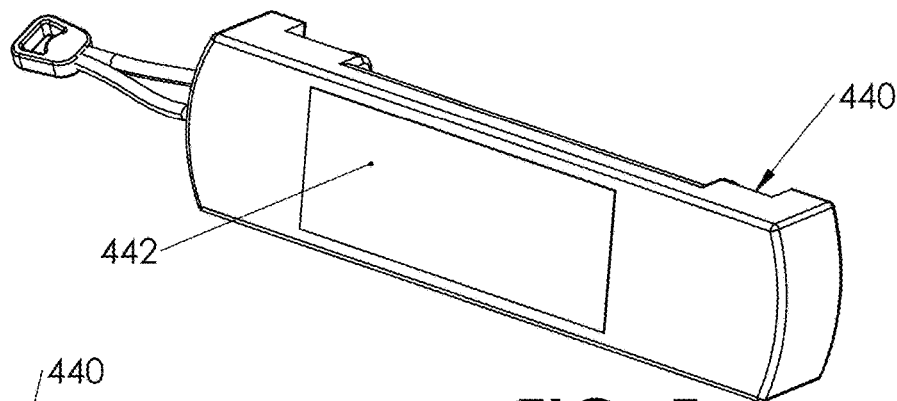
FIG. 5 is a back perspective view of a temperature probe holder or recharging/indicator case in accordance with embodiments of the invention.
Figure 6:
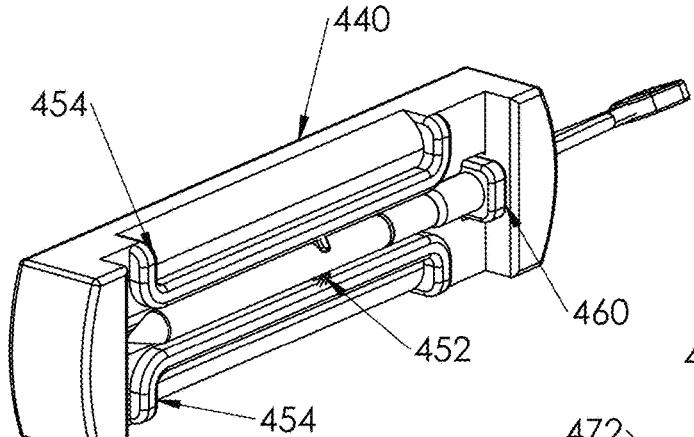
FIG. 6 is a front perspective view of a temperature probe holder or recharging/indicator case in accordance with embodiments of the invention.

With reference to FIGS. 2 and 3, the electronic controller system 400 may include a control dial 402 and a control screen 405. The control dial 402 may include control dial button 404. Inputs from the control dial 402 may be accomplished through a combination of pivoting the dial and pressing the control dial button 404. Inputs made using the control dial 402 may be reflected in the control screen 405. The control screen 405 may include the one or more of the following indicators and readouts: main temperature (RTD) indicator 406, time indicator 408, prime indicator 410, clean out indicator 412, connectivity indicator 414, unit battery indicator 416, power cord connection indicator 418, programmable wireless temperature probe temperature indicator 420, wireless temperature probe battery indicator 422, fan assembly engaged indicator 424, auger or fuel supply assembly engaged indicator 426, spark igniter assembly engaged indicator 428, pellet or fuel low indicator 430, and recipe indicator 432.

The electronic controller system 400 may be permanently (i.e., fixedly) or removably installed in the grill, smoker or griddle 10. When installed, the electronic controller system 400 may be powered by an AC connection, or by an onboard alternative power system, such as a primary DC battery connection. When DC powered, a battery compartment and a battery may be provided below the hopper lid (328 in FIG. 1) or elsewhere in the head unit (200 in FIG. 1). The battery compartment may also house an optional battery charger (not shown) that is connected to an optional AC receptacle (not shown). The battery charger may be connected to the battery. A pellet spark igniter system or assembly, a combustion air feed fan assembly, and a pellet feed or fuel supply system or assembly may be operated automatically by the controller system 400.

With reference to FIGS. 4, 5, 6 and 7, the wireless temperature probe monitor/holder 440 may include a direct current (DC) battery or batteries that are AC rechargeable or replaceable. The battery may be connected to, and power, a monitor display screen 442, as well as recharge a battery-operated wireless temperature probe 460 when the probe is inserted into the probe monitor/holder as shown. Induction coil recharging elements 454 may be connected to the battery included in the probe monitor/holder 440 and may flank the elongated body of the temperature probe 460 when it is inserted into the probe monitor/holder. The temperature probe 460 may include probe head 464 that seats against a notched seat area provided at one end of the probe monitor/holder 440. The end of the probe monitor/holder 440 leading away from the notched seat area may include a recess and a flexible clamp 452 to receive the probe. As noted, the battery may also power a holder screen 442. The holder screen 442 may include multiple indicators and readouts, including without limitation, a monitor/holder probe indicator 444, a probe numeric temperature indicator 446, and a monitor/holder (and/or probe) battery indicator 448. The probe monitor/holder The probe holder 440 may also incorporate a magnet, or otherwise permit a magnetic connection to a magnetic holder provided on the pellet grill 10. Preferably, the wireless temperature probe 460, the wireless temperature probe monitor/holder 440, and the electronic controller (400 in FIGS. 2 and 3) are wirelessly paired together by the manufacturer (which includes resellers) prior to purchase by an end user.

Figure 7:
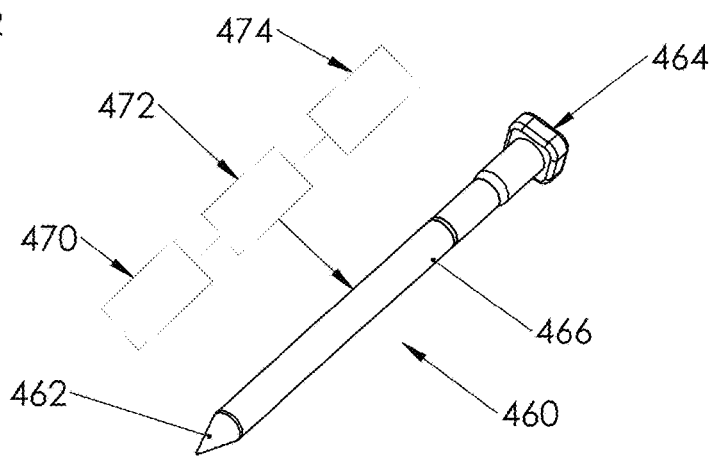
FIG. 7 is a perspective view and exploded view of a temperature probe in accordance with embodiments of the invention.

With reference to FIG. 7, the wireless temperature probe 460 may include a probe head 464 at one end, a probe insertion point 462 at an opposite end, and an intermediary probe body 466. When separated from the probe holder 440, the probe 460 may be inserted into a food item to sense the internal temperature of the food item and wireless communicate the sensed temperature to the wireless monitor/holder 440 and electronic controller 400 via a wireless connection for display. The probe body 466 may contain a probe battery 470 that is electrically connected to and powers a probe temperature sensor 472 and a probe wireless transmitter 474. The probe battery 470 may be recharged using a direct or contactless recharging system 454 incorporated into the probe holder 440.

With reference to FIGS. 2-7, the electronic controller system 400 may use a feed-back loop including one or more of the RTDs and/or other temperature sensors such as one or more wireless thermometer probes (shown in FIG. 7) to provide a selected level of heat in the cooking chamber by adjusting the operation of the pellet igniter system, air feed fan, and/or pellet feed system.

Figure 8:
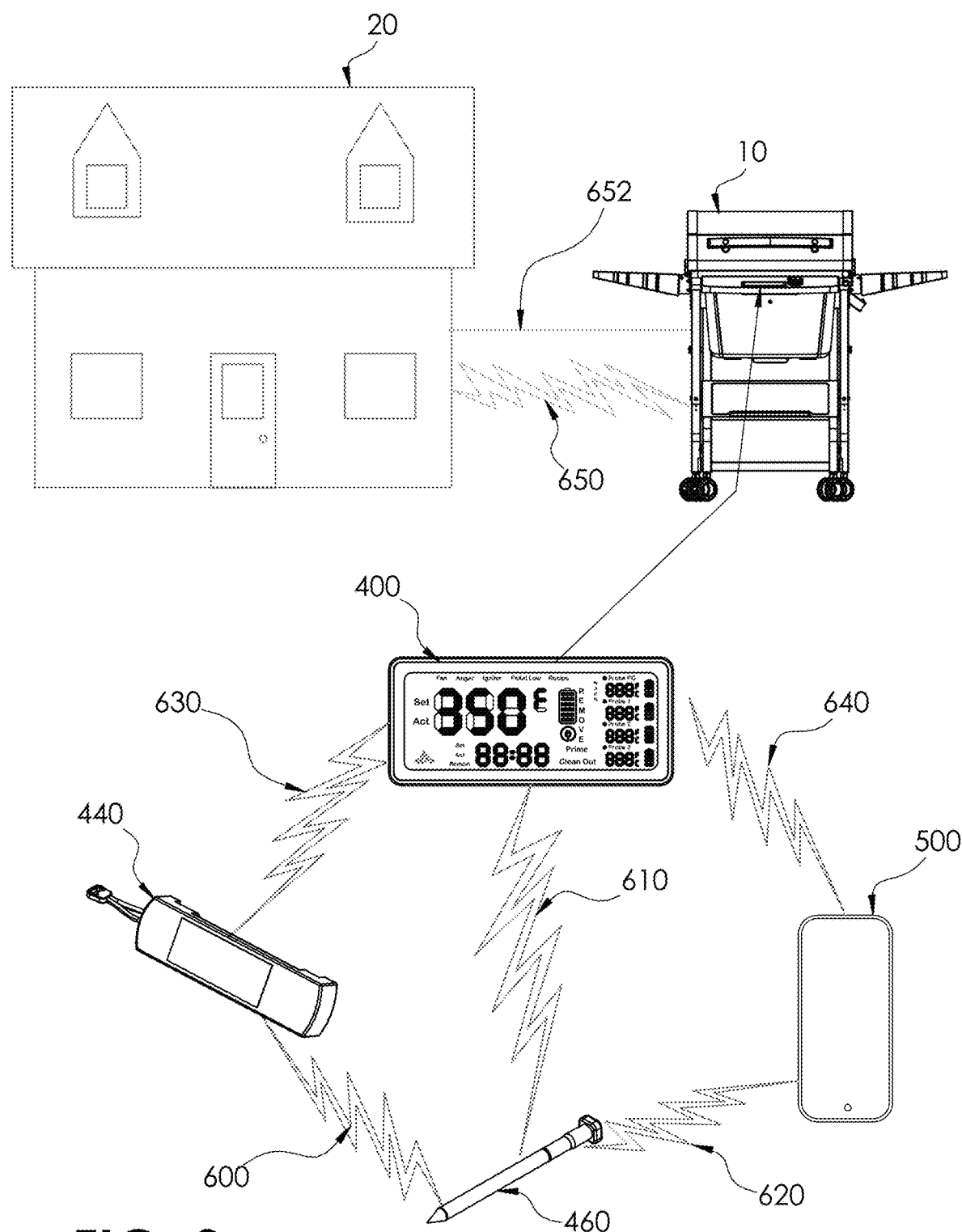
FIG. 8 is a schematic view of a grill, smoker or griddle control system in accordance with embodiments of the invention.

With reference to FIG. 8, the electronic controller system 400 may be connected by a hard-wire connection 652, or a wireless connection 650 to another network, such as a PAN, LAN, MAN, WAN, GAN (e.g., Internet), MANET, cellular network, mobile network, or the like, based in a home 20. The terms "wireless" and "wireless connection" as used herein are intended to describe connections made using wireless transmitters of any type, as referenced above, including without limitation, a radio frequency (RF) transmitter/receiver, a mobile broadband transmitter/receiver, a Wi-Fi transmitter/receiver, and a Bluetooth transmitter/receiver. The electronic controller system 400 also may have a first wireless connection 610 to a wireless temperature probe or thermometer 460, a second wireless connection 630 to a temperature probe monitor/holder 440, and a third wireless connection 640 to a wireless smart device 500 having an application to communicate with the electronic controller system 400. The wireless temperature probe 460 may also, or optionally, have a wireless connection 600 directly to the probe monitor/holder 440 and/or a wireless connection 620 to the wireless smart device 500. It is appreciated that the controller system 400 may act as a wireless "hub" to receive temperature information from the wireless thermometer 460 and relay such information to the electronic controller system programmable probe temperature indicator 420 (FIG. 2), and/or to the monitor/holder 440, and/or to the wireless smart device 500.

Figure 9:
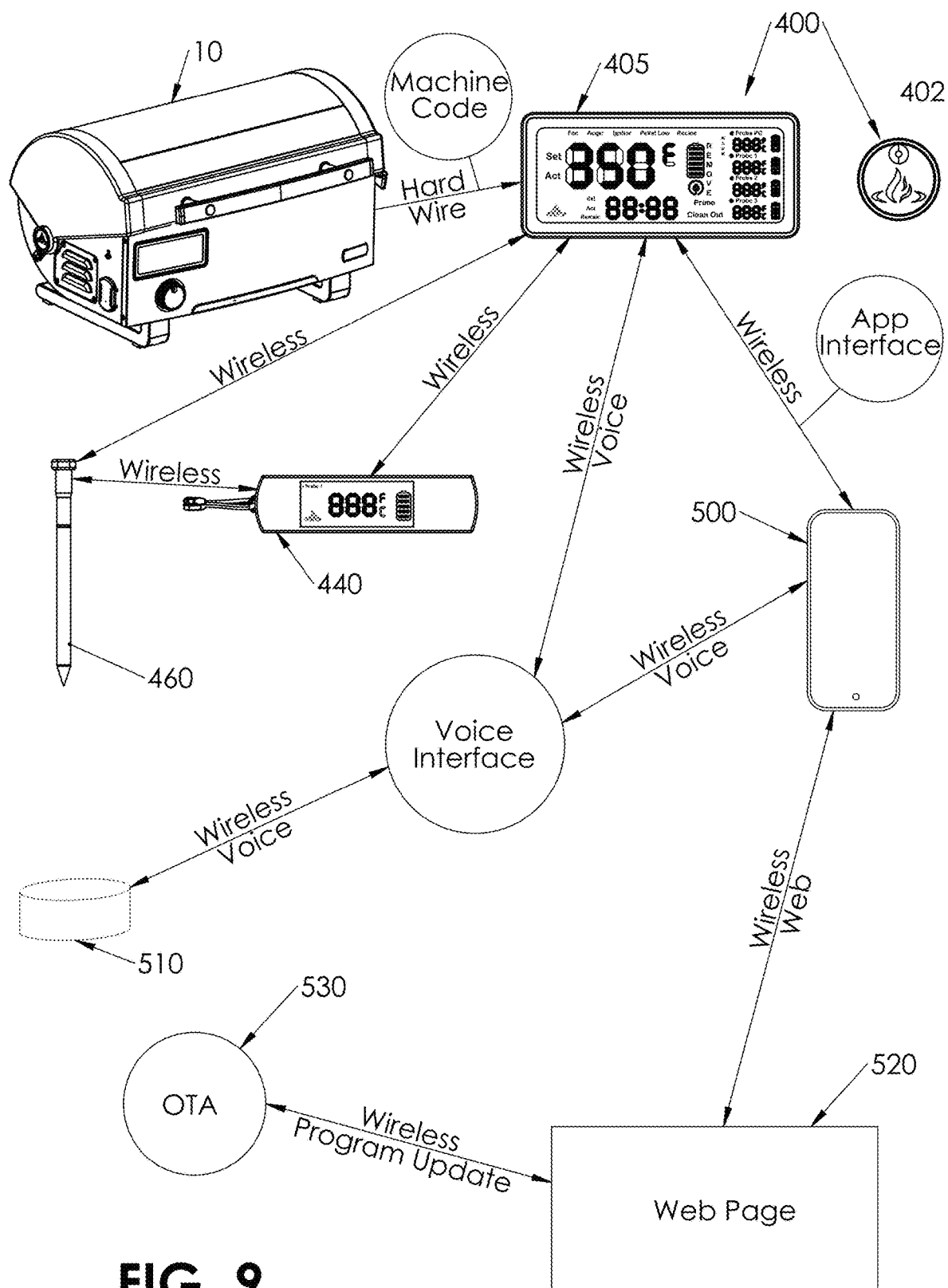
FIG. 9 is a schematic view of a grill, smoker or griddle control system in accordance with alternative embodiments of the invention.
Figure 10:
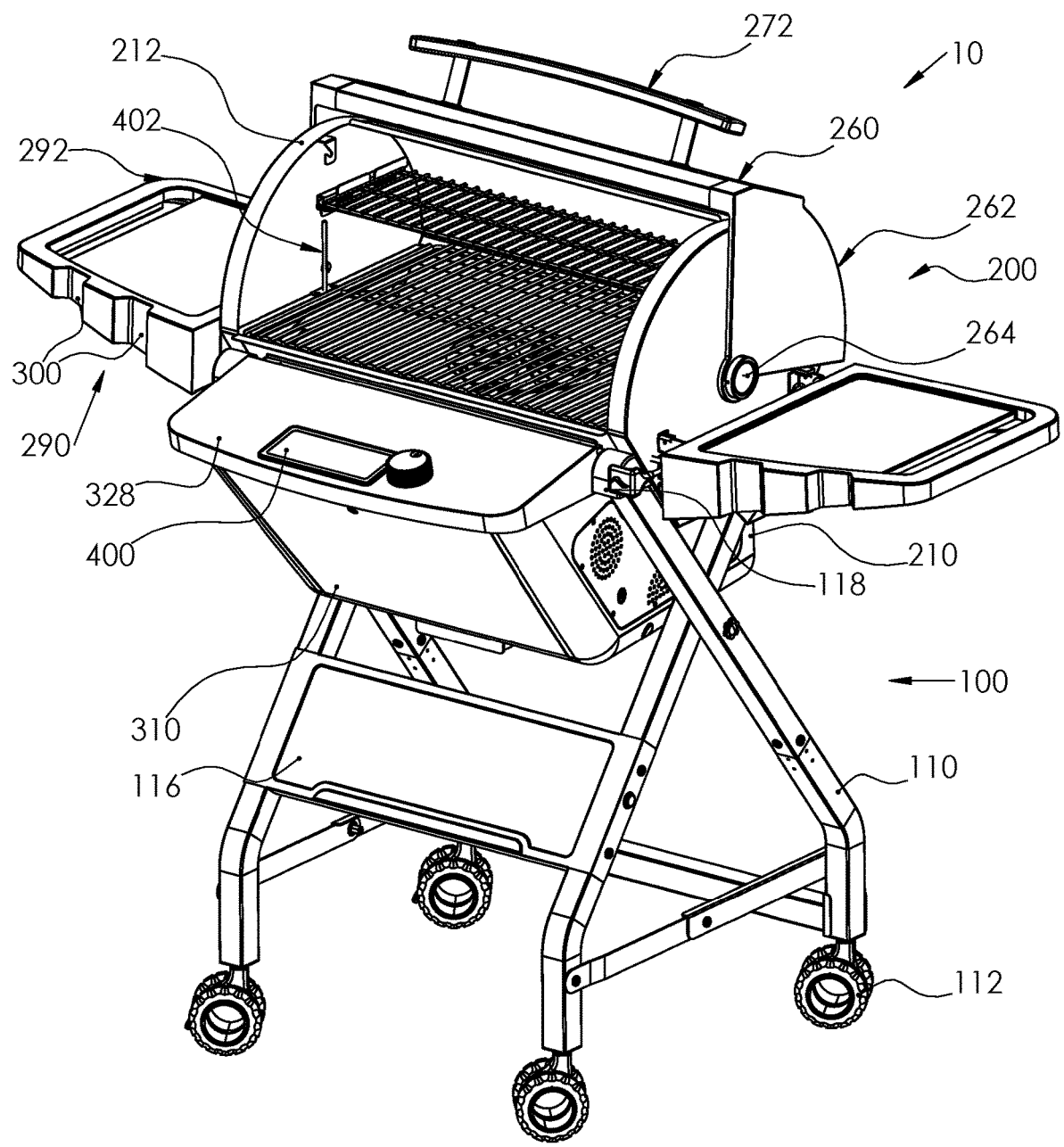

With reference to FIG. 9, a preferred system for controlling the outdoor cooking DC powered appliance 10 associated with a manufacturer may include a DC battery, a heat generating system, a cooking surface, and a resistance temperature detector (RTD), all of which are DC powered. The heat generating system in the appliance 10 may include a fuel supply assembly, a fan assembly, and a spark generating assembly. The appliance 10 may be hard wire connected to an electronic controller 400 including a human interface readout screen 405 and a control knob 402. More specifically, the electronic controller 400 may be hardwired to the fuel supply assembly, the fan assembly, and the spark generating assembly in the appliance 10. A wireless temperature probe 460 may wirelessly paired to the electronic controller 400. Further, a wireless monitor/holder/recharger device 440 may be dedicated to, and wirelessly paired to, the wireless temperature probe 460 and to the electronic controller 400. Preferably, the wireless temperature probe 460 and the wireless monitor/holder/recharger device 440 are wirelessly paired to each other by the manufacturer prior to purchase by an end user. The wireless monitor device 440 may include a battery-operated display that indicates a numeric temperature measured by the wireless temperature probe 460. The electronic controller 400 may be wirelessly connected to a smart device 500, which in turn may be wirelessly connected to a wireless voice receiver 510. The smart device 500 may be used to wirelessly connect to an Internet accessible data source 520 associated with the manufacturer. The Internet accessible data source 520 (e.g., Web Page) may be periodically, or selectively, updated over the air (OTA) to provide program updates for the electronic controller 400 and smart device 500. Cooking recipe information may be provided from the Internet accessible data source 520 to the smart device 500 and electronic controller 400, and, responsive to electronic information provided by one or more of the smart device, the Internet accessible data source, the wireless temperature probe, and the RTD, the electronic controller may control the operation of the fuel supply assembly, the fan assembly, and the spark generating assembly included in the appliance 10.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed:

1. An outdoor cooking appliance system associated with a manufacturer, comprising:
   an outdoor cooking appliance head unit, said head unit including a heat generating system;
   said heat generating system including one or more of a fuel supply assembly, a fan assembly, and a spark generating assembly;
   an electronic controller fixedly connected to the head unit, said electronic controller having a human interface readout screen and a control input mechanism, said electronic controller hardwired to one or more of the fuel supply assembly, the fan assembly, and the spark generating assembly;
   a wireless temperature probe wirelessly paired via Bluetooth to the electronic controller; and
   a wireless monitor device dedicated to, and wirelessly paired via Bluetooth to, the wireless temperature probe, said wireless monitor device including a battery-operated display configured to indicate a numeric temperature measured by the wireless temperature probe,
   wherein the electronic controller is configured to wirelessly connect to a smart device,
   wherein the electronic controller is configured to wirelessly connect to an Internet accessible data source associated with the manufacturer, and
   wherein, responsive to one or more of a temperature measurement and electronic information provided by one or more of the smart device, the Internet accessible data source, and the wireless temperature probe, the electronic controller is configured to control one or more of:
      the operation of the fuel supply assembly,
      the operation of the fan assembly, and
      the operation of the spark generating assembly.

2. The system of claim 1, wherein the electronic controller is configured to control the operation of the fuel supply assembly, the operation of the fan assembly, and the operation of the spark generating assembly.

3. The system of claim 1, wherein the electronic controller is configured to control the operation of the fuel supply assembly and the operation of the fan assembly.

4. The system of claim 1, wherein the electronic controller is configured to control the operation of the fuel supply assembly and the operation of the spark generating assembly.

5. The system of claim 1, wherein the electronic controller is configured to control the operation of the fan assembly and the operation of the spark generating assembly.

6. The system of claim 1, wherein the wireless monitor device includes a cavity for receiving and holding the wireless temperature probe.

7. The system of claim 6, wherein the wireless monitor device includes:
   a DC battery; and
   an induction coil operatively connected to the DC battery, said induction coil configured to recharge the wireless temperature probe.

8. The system of claim 1, wherein the wireless monitor device includes:
   a DC battery; and
   an induction coil operatively connected to the DC battery, said induction coil configured to recharge the wireless temperature probe.

9. The system of claim 1, further comprising:
   a primary DC battery disposed within said head unit, said primary DC battery configured to power the electronic controller and to power one or more of the fuel supply assembly, the fan assembly, and the spark generating assembly.

10. The system of claim 1, wherein the wireless temperature probe and the wireless monitor device are wirelessly paired to each other by the manufacturer.

11. The system of claim 1, wherein the wireless temperature probe and the electronic controller are wirelessly paired to each other by the manufacturer.

12. A system for controlling an outdoor cooking appliance associated with a manufacturer, comprising:
   an outdoor cooking appliance head unit, said head unit including a heat generating system, a cooking surface, and a resistance temperature detector (RTD);
   said heat generating system including one or more of a fuel supply assembly, a fan assembly, and a spark generating assembly;
   an electronic controller fixedly connected to the head unit, said electronic controller having a human interface readout screen and a control input mechanism knob, said electronic controller hardwired to one or more of the fuel supply assembly, the fan assembly, and the spark generating assembly;
   a wireless temperature probe wirelessly paired to the electronic controller;
   a wireless monitor device dedicated to, and wirelessly paired to, the wireless temperature probe, said wireless monitor device including a battery-operated display configured to indicate a numeric temperature measured by the wireless temperature probe, said wireless monitor device including a cavity for receiving and holding the wireless temperature probe, a DC battery, and an induction coil operatively connected to the DC battery, said induction coil configured to recharge the wireless temperature probe; and
   a primary DC battery disposed within said head unit, said primary DC battery configured to power the electronic controller and to power one or more of the fuel supply assembly, the fan assembly, and the spark generating assembly,
   wherein the wireless temperature probe and the wireless monitor device are wirelessly paired to each other by the manufacturer,
   wherein the electronic controller is configured to wirelessly connect to a smart device,
   wherein the electronic controller is configured to wirelessly connect to an Internet accessible data source associated with the manufacturer through said smart device, and
   wherein, responsive to electronic information provided by one or more of the smart device, the Internet accessible data source, the wireless temperature probe, and the RTD, the electronic controller is configured to control the operation of the fuel supply assembly and the operation of the spark generating assembly.

* * * * *